United States Patent
Bostick et al.

(10) Patent No.: US 8,756,196 B2
(45) Date of Patent: *Jun. 17, 2014

(54) PROPAGATING TABLES WHILE PRESERVING CYCLIC FOREIGN KEY RELATIONSHIPS

(75) Inventors: James E. Bostick, Cedar Park, TX (US); Randolph M. Forlenza, Austin, TX (US); John P. Kaemmerer, Pflugerville, TX (US); Raghuraman Kalyanaraman, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/606,830

(22) Filed: Sep. 7, 2012

(65) Prior Publication Data

US 2012/0330890 A1 Dec. 27, 2012

Related U.S. Application Data

(63) Continuation of application No. 11/427,930, filed on Jun. 30, 2006, now Pat. No. 8,285,677.

(51) Int. Cl.
*G06F 17/30* (2006.01)

(52) U.S. Cl.
CPC .... *G06F 17/30595* (2013.01); *G06F 17/30306* (2013.01)
USPC ............ 707/638; 707/673; 707/693; 707/803

(58) Field of Classification Search
CPC .................... G06F 17/30286; G06F 17/30595; G06F 17/30306; G06F 17/30371
USPC ......... 707/1, 3, 100, 104, 200, 201, 638, 673, 707/693, 803, 809
See application file for complete search history.

(56) References Cited

U.S. PATENT DOCUMENTS

| | | | |
|---|---|---|---|
| 4,918,593 | A | 4/1990 | Huber |
| 5,553,218 | A | 9/1996 | Li et al. |
| 5,819,254 | A | 10/1998 | Kawai |
| 5,956,725 | A | 9/1999 | Burroughs et al. |
| 6,138,111 | A | 10/2000 | Krishna |
| 6,295,539 | B1 | 9/2001 | Isip, Jr. |
| 6,542,883 | B1 | 4/2003 | Salo |
| 6,584,476 | B1 | 6/2003 | Chatterjee et al. |
| 6,636,870 | B2 | 10/2003 | Roccaforte |

(Continued)

OTHER PUBLICATIONS

Office Action regarding U.S. Appl. No. 10/855,736, dated Jan. 8, 2007, 10 pages.

(Continued)

*Primary Examiner* — Jay Morrison
*Assistant Examiner* — Dangelino Gortayo
(74) *Attorney, Agent, or Firm* — Yee & Associates, P.C.; Mark C. Vallone

(57) ABSTRACT

The invention meeting the need identified above is the "Enhanced Database Propagation Program" or (EDPP). EDPP uses a cyclic member table that identifies a first source table in a cyclic relationship with a second source table. The first source table, identified in the cyclic member table, propagates first. EDPP replaces all foreign keys with "NULL" in the first target table. After the second source table in the subscription set has propagated to a second target table, EDPP updates first target table with the foreign keys from the first source table.

6 Claims, 5 Drawing Sheets

(56) References Cited

U.S. PATENT DOCUMENTS

| | | |
|---|---|---|
| 6,658,540 B1 | 12/2003 | Sicola et al. |
| 6,799,190 B1 | 9/2004 | Boothby |
| 6,925,477 B1 | 8/2005 | Champagne et al. |
| 7,007,003 B1 | 2/2006 | Rybicki |
| 7,031,956 B1 | 4/2006 | Lee et al. |
| 7,272,591 B1 | 9/2007 | Ghazal et al. |
| 7,346,627 B2 | 3/2008 | Ramanathan et al. |
| 7,383,273 B2 | 6/2008 | Wang et al. |
| 7,412,455 B2 | 8/2008 | Dillon |
| 7,487,168 B2 * | 2/2009 | Rys et al. ............... 707/999.1 |
| 7,555,493 B2 * | 6/2009 | Khayter et al. ......... 707/999.102 |
| 7,739,223 B2 * | 6/2010 | Vaschillo et al. ...... 707/999.101 |
| 2004/0220956 A1 | 11/2004 | Dillon |
| 2005/0278277 A1 | 12/2005 | Forlenza et al. |
| 2008/0005183 A1 | 1/2008 | Bostick et al. |

OTHER PUBLICATIONS

Final Office Action regarding U.S. Appl. No. 10/855,736, dated Jun. 29, 2007, 13 pages.

Office Action regarding U.S. Appl. No. 10/855,736, dated Dec. 12, 2007, 13 pages.

Final Office Action regarding U.S. Appl. No. 10/855,736, dated Aug. 7, 2008, 19 pages.

Appeal Brief regarding U.S. Appl. No. 10/855,736, dated Nov. 5, 2008, 24 pages.

Office Action regarding U.S. Appl. No. 10/855,736, dated Feb. 5, 2009, 10 pages.

Office Action regarding U.S. Appl. No. 11/427,930, dated Apr. 2, 2008, 16 pages.

Response to Office Action regarding U.S. Appl. No. 11/427,930, dated Jul. 2, 2008, 9 pages.

Final Office Action regarding U.S. Appl. No. 11/427,930, dated Oct. 21, 2008, 8 pages.

Appeal Brief regarding U.S. Appl. No. 11/427,930, dated Mar. 16, 2009, 27 pages.

Examiner's Answer regarding U.S. Appl. No. 11/427,930, dated Jun. 1, 2009, 17 pages.

Reply Brief regarding U.S. Appl. No. 11/427,930, dated Jul. 21, 2009, 17 pages.

Decision on Appeal regarding U.S. Appl. No. 11/427,930, dated May 18, 2012, 8 pages.

Notice of Allowance regarding U.S. Appl. No. 11/427,930, dated May 31, 2012, 7 pages.

\* cited by examiner

| T1_COL1 | T1_COL2 | T1_COL3 |
|---|---|---|
| 101 | T1 SAMPLE DATA 1 | (T2_COL1) 10007 |
| 102 | T1 SAMPLE DATA 2 | (T2_COL1) 10007 |
| 105 | T1 SAMPLE DATA 3 | (T2_COL1) 10054 |
| 107 | T1 SAMPLE DATA 4 | (T2_COL1) 10002 |

FIG. 1

| T2_COL1 | T2_COL2 | T2_COL3 |
|---|---|---|
| 10007 | T2 SAMPLE DATA 1 | (T1_COL1) 101 |
| 10007 | T2 SAMPLE DATA 2 | (T1_COL1) 102 |
| 10054 | T2 SAMPLE DATA 3 | (T1_COL1) 105 |
| 10002 | T2 SAMPLE DATA 4 | (T1_COL1) 107 |

FIG. 2

| T_T1_COL1 | T_T1_COL2 | T_T1_COL3 |
|---|---|---|

| T_T1_COL1 | T_T1_COL2 | T_T1_COL3 |
|---|---|---|
| 101 | T1 SAMPLE DATA 1 | NULL |
| 102 | T1 SAMPLE DATA 2 | NULL |
| 105 | T1 SAMPLE DATA 3 | NULL |
| 107 | T1 SAMPLE DATA 4 | NULL |

| T_T2_COL1 | T_T2_COL2 | T_T2_COL3 |
|---|---|---|
| | | |

FIG. 7C

| T_T2_COL1 | T_T2_COL2 | T_T2_COL3 |
|---|---|---|
| 10007 | T2 SAMPLE DATA 1 | (T1_COL1) 101 |
| 10007 | T2 SAMPLE DATA 2 | (T1_COL1) 102 |
| 10054 | T2 SAMPLE DATA 3 | (T1_COL1) 105 |
| 10002 | T2 SAMPLE DATA 4 | (T1_COL1) 107 |

FIG. 7D

| T_T1_COL1 | T_T1_COL2 | T_COL3 |
|---|---|---|
| 101 | T1 SAMPLE DATA 1 | (T2_COL1) 10007 |
| 102 | T1 SAMPLE DATA 2 | (T2_COL1) 10007 |
| 105 | T1 SAMPLE DATA 3 | (T2_COL1) 10054 |
| 107 | T1 SAMPLE DATA 4 | (T2_COL1) 10002 |

FIG. 7E

PROPAGATING TABLES WHILE PRESERVING CYCLIC FOREIGN KEY RELATIONSHIPS

This application is a continuation of U.S. patent application Ser. No. 11/427,930 filed Jun. 30, 2006, status allowed.

FIELD OF THE INVENTION

The present invention relates generally to database maintenance in a computer or digital processing system, and relates particularly to a method of propagating tables while preserving cyclic foreign key relationships.

BACKGROUND OF THE INVENTION

A database is any collection of information organized for rapid search and retrieval. A database stored in a computer-readable medium is commonly modeled as a collection of one or more tables. Each table, in turn, is modeled as a collection of one or more records (also commonly referred to as a "row"), and each record as a collection of one or more fields (also commonly referred to as a "column"). In a conventional table, all records comprise the same number and type of fields, and in the same order. A relational database consists of tables that are "related" to each other through common fields. The most common way to establish a relationship between two tables is to include one or more fields in each table that hold "key" information. A "primary key" field uniquely identifies a record, and commonly is just a number unrelated to other data in the record. A "foreign key" field is an identifier in a record that establishes a relationship with a primary key in another table. For example, employee records might have an "employee" table containing a "department_id" field that references data located in a "department" table's "dept_id" field. In this example, the dept_id field uniquely identifies each department, while the department_id field identifies the department in which an employee works. Thus, in this example, dept_id would be a primary key, and department_id would be the foreign key that establishes the relationship between the employee table and the department table. The integrity of the table relationship depends on the foreign key referencing a valid primary key. Most modern database management systems allow users to designate foreign key fields when tables are created, and subsequently reject operations that would result in an invalid foreign key reference. Thus, all foreign key values must have equivalent primary key values that already exist in the other table.

As is well known in the art, it is sometimes advantageous to replicate databases on other computers or servers, or even on the same computer or server. It is common, though, for a database to hold thousands of tables and millions of records, and replicating these databases can be a difficult and cumbersome task. Several software tools exist in the art to assist a database administrator with the task of replicating (also called "propagating") databases among servers, including DpropR—a database utility developed by IBM. On the most basic level, DpropR extracts data from a first "source" database on a first server and pushes the data to a second "target" database on a second server. DpropR removes "foreign keys" from the second or target database. When supporting two-way propagation, where data is propagated in both directions between the two databases, DpropR also removes "foreign keys" from the first or source database. An improvement to DropR (see discussion of U.S. patent application Ser. No. 10/855,736 below) allows a database administrator to control the order of propagation to preserve foreign key integrity, and thereby eliminates the need to remove foreign keys.

In order to propagate databases between servers, DpropR or other database propagation utilities use "subscription sets" to determine which tables should be propagated, and to which servers. A subscription set generally comprises a list of tables that a database administrator or user treats as a single unit for purposes of database propagation. A database administrator specifies in advance what tables are included in a subscription set, and can create more than one subscription set if needed or desired.

Subscription sets are themselves typically stored in relational tables: a "subscription" table and a "member" table. A subscription table comprises records identifying a subscription set, the server having the source database to be copied, and the target database to which the source database should be copied. The subscription set may also contain other useful information, such as a value indicating the last time the source database was copied, and a value indicating a frequency for copying the source table.

A member table comprises records identifying a source table, the subscription set to which the source table belongs, and the name of the target table to which the source table should be copied. Each subscription set identified in the member table must have a corresponding record in the subscription table. Note, though, that a source table can appear in more than one subscription set.

U.S. patent application Ser. No. 10/855,736 (the '736 application) discloses a method and apparatus for propagating relational database tables that allow a database administrator to control the order of propagation, and thereby preserve foreign key integrity. The '736 application's improvement to DpropR or other database propagation utilities adds an additional field to each member table and subscription set called ORDER. The additional field enables an administrator or other user to assign a rank to each subscription set and to each table within a subscription set, and then use the rankings to determine the order in which to propagate database tables. The rankings ensure that tables with a primary key referenced by a foreign key are propagated before the table with the foreign key is propagated, avoiding an invalid foreign key reference.

One embodiment of the improvement disclosed in application Ser. No. 10/855,736 uses two programs CAPTURE and APPLY. CAPTURE monitors a database for changes and causes APPLY to propagate source tables of the subscription sets in the designated order. Something that U.S. patent application Ser. No. 10/855,736 explicitly does not address is the situation of "cyclic foreign keys." Cyclic foreign keys occur when a field in TABLE1 references a field in TABLE2, which in turn references a field in TABLE1. Illustrated below as:

TABLE1→TABLE2→TABLE1

Of course, cyclic references can be more complex, involving more than two tables:

TABLE1→TABLE2→TABLE3→TABLE1

An example of TABLE1 and TABLE2 with a cyclic relation are shown in FIG. 1 and FIG. 2. TABLE1 in FIG. 1 has three columns: T1_COL1, T1_COL2 and T1_COL3. The first column, T1_COL1, contains primary keys. The second column, T1_COL2 contains additional data, and the third column, T1_COL3 contains foreign keys referencing a primary key in the first column (T2_COL1) of TABLE2. Likewise, TABLE2 in FIG. 2 has three columns: T2_COL1, T2_COL2 and T2_COL3. The first column, T2_COL1, contains primary keys. The second column, T2_COL2 contains additional data, and the third column, T2_COL3 contains foreign keys referencing a primary key in the first column (T1_COL1) of TABLE1. Propagating either TABLE1 or TABLE2 to another server without propagating the other table results in an invalid foreign key reference in the third column.

Simply propagating tables in a specific order does not work with cyclic references. One of the tables has to propagate first, which inevitably results in an invalid foreign key reference unless the foreign references are manually removed from the target table to be propagated. A need exists for a system and method to automatically propagate tables containing cyclic references, without permanently removing any foreign keys.

These and other objects of the invention will be apparent to those skilled in the art from the following detailed description of a preferred embodiment of the invention.

SUMMARY OF THE INVENTION

The invention meeting the need identified above is the "Enhanced Database Propagation Program" or (EDPP). EDPP uses a "cyclic member table" that identifies a first source table with cyclic foreign key relationships with a second source table. The first source table, identified in the cyclic member table, propagates first. EDPP replaces all foreign keys with "NULL" in the first target table. After the second source table in the subscription set has propagated to a second target table, EDPP updates the first target table with the foreign keys from the first source table.

The EDPP also works when there are more than two interrelated tables. All tables, save the last one, must be copied to target tables with "NULL" replacing the foreign keys. Then, EDPP copies the last table to a last target table, which includes the foreign keys. After the last table is copied, the preceding tables are updated with the original foreign keys. The procedure for more than two tables is usually done in a particular sequence, where the tables are copied in a particular order, and then updated and the reverse order.

BRIEF DESCRIPTION OF DRAWINGS

The novel features believed characteristic of the invention are set forth in the appended claims The invention itself, however, as well as a preferred mode of use, further objectives and advantages thereof, will be understood best by reference to the following detailed description of an illustrative embodiment when read in conjunction with the accompanying drawings, wherein:

FIG. 1 is an exemplary table with foreign keys;

FIG. 2 is an exemplary table with foreign keys;

FIG. 6 is a flowchart of an Update program; and

FIG. 7A-7E is an example propagation of tables with a cyclic relationship.

DETAILED DESCRIPTION OF THE PREFERRED EMBODIMENT

The principles of the present invention are applicable to a variety of computer hardware and software configurations. The term "computer hardware" or "hardware," as used herein, refers to any machine or apparatus that is capable of accepting, performing logic operations on, storing, or displaying data, and includes without limitation processors and memory; the term "computer software" or "software," refers to any set of instructions operable to cause computer hardware to perform an operation. A "computer," as that term is used herein, includes without limitation any useful combination of hardware and software, and a "computer program" or "program" includes without limitation any software operable to cause computer hardware to accept, perform logic operations on, store, or display data. A computer program may, and often is, comprised of a plurality of smaller programming units, including without limitation subroutines, modules, functions, methods, and procedures. Thus, the functions of the present invention may be distributed among a plurality of computers and computer programs The invention is described best, though, as a single computer program that configures and enables one or more general-purpose computers to implement the novel aspects of the invention. For illustrative purposes, the inventive computer program will be referred to as the "Enhanced Database Propagation Program" or (EDPP).

Figure 3:
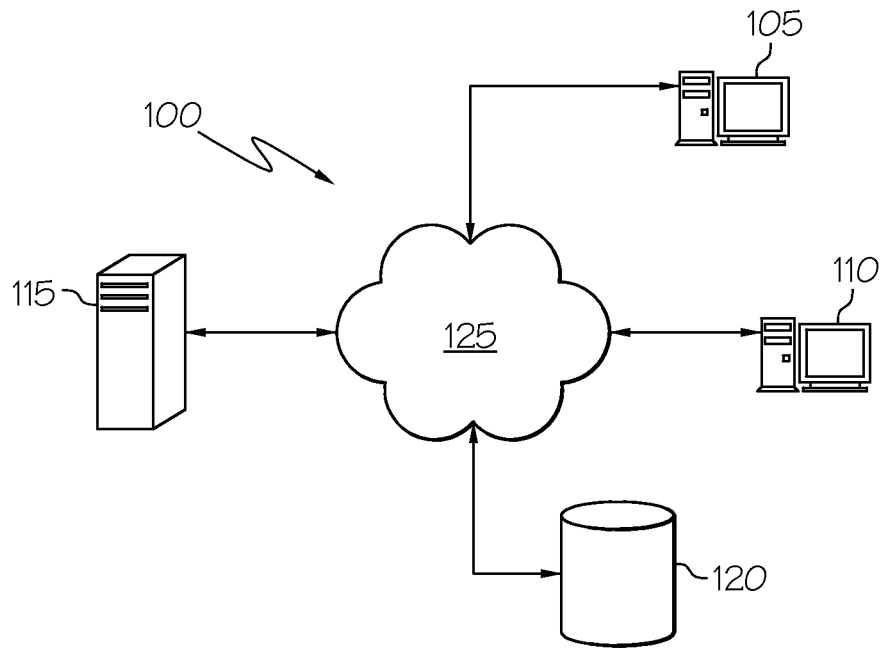
FIG. 3 is an exemplary network.

Additionally, the EDPP is described below with reference to an exemplary network of hardware devices, as depicted in FIG. 3. A "network" comprises any number of hardware devices coupled to and in communication with each other through a communications medium, such as the Internet. A "communications medium" includes without limitation any physical, optical, electromagnetic, or other medium through which hardware or software can transmit data. For descriptive purposes, exemplary network 100 has only a limited number of nodes, including workstation computer 105, workstation computer 110, server computer 115, and persistent storage 120. Network connection 125 comprises all hardware, software, and communications media necessary to enable communication between network nodes 105-120. Unless otherwise indicated in context below, all network nodes use publicly available protocols or messaging services to communicate with each other through network connection 125.

Figure 4:
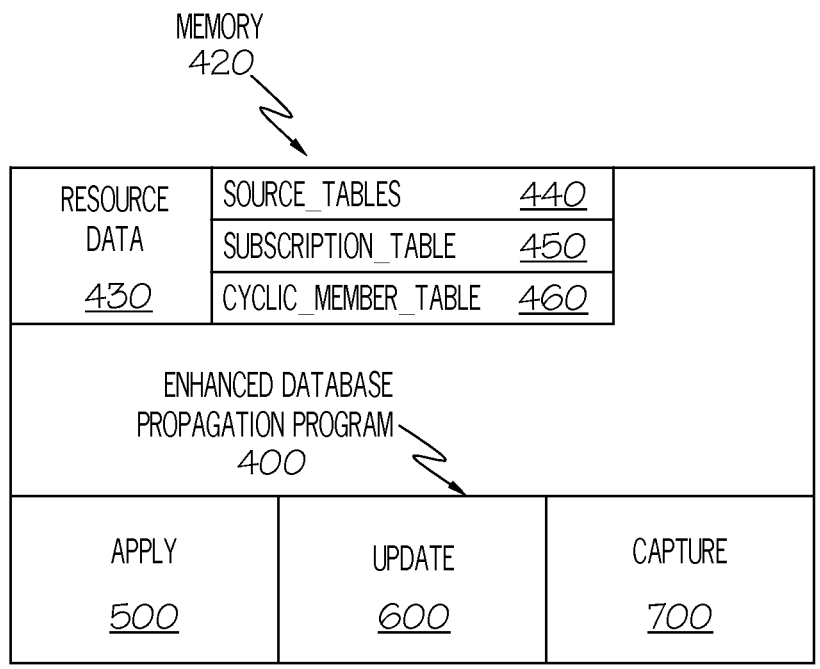
FIG. 4 describes programs and files in a memory on a computer.

EDPP 400 typically is stored in a memory, represented schematically as memory 420 in FIG. 4. The term "memory," as used herein, means any volatile or persistent medium, such as a magnetic disk, or optical disk, in which a computer can store data or software for any duration. The term "memory" does not encompass a signal propagation media such as a copper cable, optical fiber or wireless transmission media." A single memory may encompass and be distributed across a plurality of media. Further, EDPP 400 may reside in more than one memory distributed across different computers, servers, logical partitions or other hardware devices. The elements depicted in memory 420 may be located in or distributed across separate memories in any combination, and EDPP 400 may be adapted to identify, locate and access any of the elements and coordinate actions, if any, by the distributed elements. Thus, FIG. 4 is included merely as a descriptive expedient and does not necessarily reflect any particular physical embodiment of memory 420. As depicted in FIG. 4, though, memory 420 may include additional data and programs. Of particular importance to EDPP 400, memory 420 may include Resource Data 430 which includes Source_Tables 440. Source_Tables 440 are database tables that are to be propagated. As with the prior art identified above, EDPP 400 uses subscription sets and member tables. By way of example, subscription sets are represented here as Subscription_Table 450. A special member table lists database tables with cyclic foreign keys, shown here as Cyclic_Member_Table 460. As with the prior art, Subscription_Table 450 and Cyclic_Member_Table 460 include an "ORDER" field, indicating an order of propagation. Cyclic_Member_Table 460, however, does not include the last database table with cyclic foreign keys to be propagated. For example, if two tables have cyclic foreign keys, then only the first table to be propagated is included in Cyclic_Member_Table 460. If three tables have cyclic foreign keys, then only the first two tables to be propagated are included, and so forth. EDPP 400 has three component programs: Apply 500, Update 600 and Capture 700.

Figure 5:
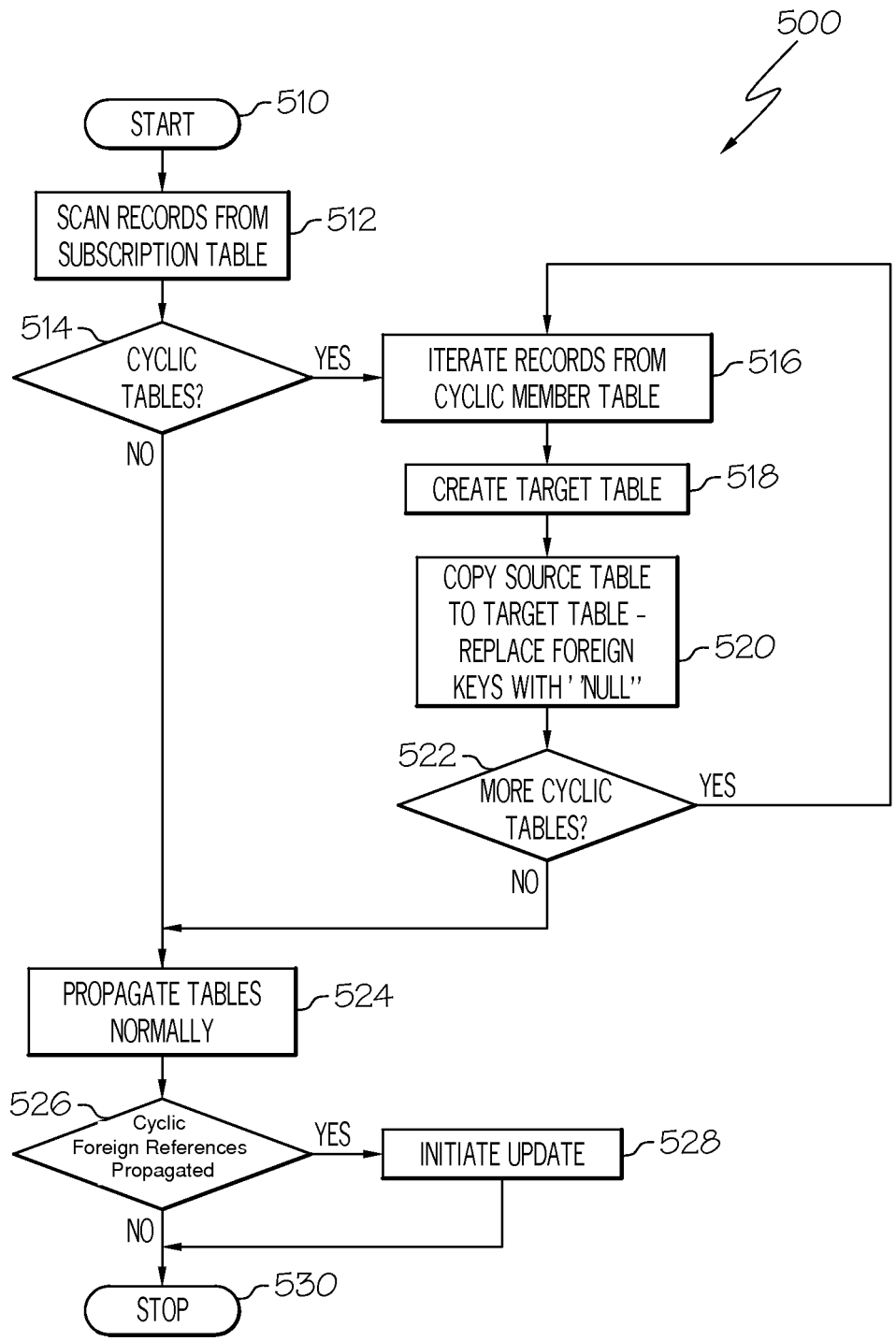
FIG. 5 is a flowchart of an Apply program.

FIG. 5 shows a flowchart of Apply 500. As with the prior art identified above, Apply 500 starts (510) as a response to a detected change by Capture 700, or otherwise initiated by a database administrator manually or automatically by another program or process. Capture 700 is known in the art, and causes Apply 500 to propagate database tables in response to detected changes in the source database tables. Apply 500 scans the records from Subscription_Table 450 for Cyclic_Member_Table 460 (512). Apply 500 determines if there are any tables with cyclic foreign key references (514). If no tables are listed with cyclic foreign key references, tables propagate normally under the prior art (524). If tables with cyclic foreign references are listed, Apply 500 iterates through the records listed in Cyclic_Member_Table 460 (516). In addition to records indicating tables with cyclic foreign keys, Cyclic_Member_Table 460 may specify a particular order for propagating the list of tables. Apply 500 creates a target database table for the next table to propagate (518). Apply 500 then copies the source database table to the target database table, replacing every foreign key reference with a "NULL" statement (520). Only a NULL statement can be used because any other word will cause a check for the foreign key, and such a check for a foreign key will cause a violation error to be thrown. Apply 500 determines if there are more tables listed in Cyclic_Member_Table 460 (522), and if so, repeats steps 516-520. Once all tables listed in Cyclic_Member_Table 460 are copied, the other tables in Subscription_Table 450 propagate normally under the prior art (524). Once all tables in Subscription_Table 450 propagate, Apply 500 determines if cyclic foreign references were propagated (526). If tables with cyclic foreign references were propagated, Apply 500 initiates Update 600 (528), otherwise, Apply 500 stops (530).

Figures 6, 7A, 7B:
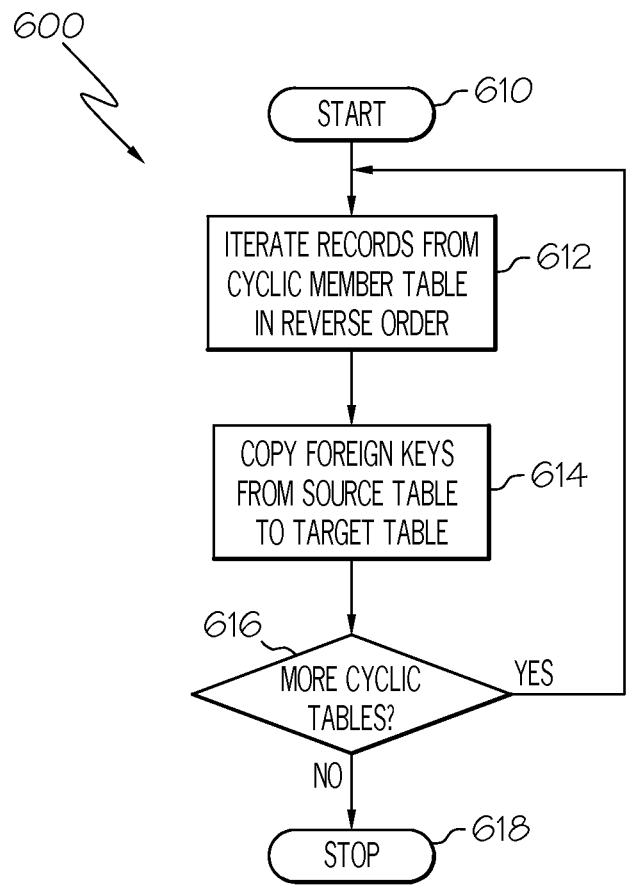

FIG. 6 shows a flowchart of Update 600 start when initiated by Apply 500 (610). Update 600 iterates through the records of tables listed in Cyclic_Member_Table 460 in reverse order (612). Update 600 copies all the foreign key references from the source table to the target table (614). Since all tables referenced by the foreign key are populated, there will not be a foreign key violation error. Update 600 determines if there are more tables listed in Cyclic_Member_Table 460 (616), and if so, repeats steps 612-614. Once all tables listed in Cyclic_Member_Table 460 are copied, Update 600 stops (618).

FIG. 7A-7E shows the propagation of the source tables with cyclic foreign key references shown in FIG. 1 and FIG. 2 using EDPP 400. Target_Table_1 is created in FIG. 7A. FIG. 7B shows Target_Table_1 populated with data from TABLE_1, but the foreign key references in column T_T1_COL3 have been replaced with "NULL." Target_Table_2 is created in FIG. 7C. FIG. 7D shows Target_Table_2 populated with data from TABLE_2, including the foreign key references in column T_T2_COL3. There will not be a foreign key violation error after the propagation of Target_Table_2, because Target_Table_1 has been created and populated with data, although some records are merely placeholders. FIG. 7E shows Target_Table_1 updated with the original foreign key references, completing the propagation process.

A preferred form of the invention has been shown in the drawings and described above, but variations in the preferred form will be apparent to those skilled in the art. The preceding description is for illustration purposes only, and the invention should not be construed as limited to the specific form shown and described. The scope of the invention should be limited only by the language of the following claims.

What is claimed is:

1. A method for propagating a plurality of database tables with cyclic foreign keys without permanently removing the cyclic foreign keys, the method comprising:
   a computer identifying a first source database table and a second source database table with a cyclic foreign key relationship by iterating through a plurality of records listed in a cyclic member table that lists the plurality of database tables with cyclic foreign keys;
   the computer creating a first target database table;
   the computer copying said first source database table to said first target database table, the copying comprising replacing all cyclic foreign keys referencing said second source database table with "NULL";
   the computer iterating through the plurality of records of said cyclic member table in reverse order; and
   the computer updating said first target database table with the cyclic foreign keys referencing the second source database table from the first source database table.

2. The method of claim 1, further comprising the computer copying said second source database table to a second target database table.

3. A computer system for propagating a plurality of database tables with cyclic foreign keys without permanently removing the cyclic foreign keys, the computer system comprising:
   one or more processors, and one or more computer readable memories;
   computer program instructions, stored on at least one of the one or more computer readable memories for execution by at least one of the one or more processors, to identify a first source database table and a second source database table with a cyclic foreign key relationship by iterating through a plurality of records listed in a cyclic member table that lists the plurality of database tables with cyclic foreign keys;
   computer program instructions, stored on at least one of the one or more computer readable memories for execution by at least one of the one or more processors, to create a first target database table;
   computer program instructions, stored on at least one of the one or more computer readable memories for execution by at least one of the one or more processors, to copy said first source database table to said first target database table, wherein the computer program instructions to copy said first source database table to said first target database table comprise computer program instructions to replace all cyclic foreign keys referencing said second source database table with "NULL";
   computer program instructions, stored on at least one of the one or more computer readable memories for execution by at least one of the one or more processors, to iterate through the plurality of records of said cyclic member table in reverse order; and
   computer program instructions, stored on at least one of the one or more computer readable memories for execution by at least one of the one or more processors, to update said first target database table with the cyclic foreign keys referencing the second source database table from the first source database table.

4. The computer system of claim 3, further comprising:
   computer program instructions, stored on at least one of the one or more computer readable memories for execution by at least one of the one or more processors, to copy said second source database table to a second target database table.

5. A computer program product for propagating a plurality of database tables with cyclic foreign keys without permanently removing the cyclic foreign keys, the computer program product comprising:

one or more computer readable memories;

computer program instructions, stored on at least one of the one or more computer readable memories, to identify a first source database table and a second source database table with a cyclic foreign key relationship by iterating through a plurality of records listed in a cyclic member table that lists the plurality of database tables with cyclic foreign keys;

computer program instructions, stored on at least one of the one or more computer readable memories, to create a first target database table;

computer program instructions, stored on at least one of the one or more computer readable memories, to copy said first source database table to said first target database table, wherein the computer program instructions to copy said first source database table to said first target database table comprise computer program instructions to replace all cyclic foreign keys referencing said second source database table with "NULL";

computer program instructions, stored on at least one of the one or more computer readable memories, to iterate through the plurality of records of said cyclic member table in reverse order; and computer program instructions, stored on at least one of the one or more computer readable memories, to update said first target database table with the cyclic foreign keys referencing the second source database table from the first source database table.

6. The computer program product of claim 5, further comprising:

computer program instructions, stored on at least one of the one or more computer readable memories, to copy said second source database table to a second target database table.

* * * * *